United States Patent [19]

Eifler et al.

[11] 4,189,443
[45] Feb. 19, 1980

[54] METHOD FOR MAKING A POLYAMINE

[75] Inventors: Willi Eifler, New Martinsville, W. Va.; Jürgen Ick, Cologne, Fed. Rep. of Germany

[73] Assignee: Bayer Aktiengesellschaft, Leverkusen, Fed. Rep. of Germany

[21] Appl. No.: 464,601

[22] Filed: Apr. 26, 1974

[51] Int. Cl.$^2$ .................... C07C 85/20; C07C 119/04
[52] U.S. Cl. .................... 260/453 PH; 260/570 D; 260/453 AM
[58] Field of Search .................... 260/570 D, 453 AM

[56] References Cited

U.S. PATENT DOCUMENTS

| | | | |
|---|---|---|---|
| 1,803,331 | 5/1931 | Kladiyko | 260/570 |
| 1,954,484 | 4/1934 | Mattison | 260/570 |
| 2,818,433 | 12/1957 | Erickson | 260/570 |
| 2,974,168 | 3/1961 | Sharp et al. | 260/570 |

FOREIGN PATENT DOCUMENTS

| | | | |
|---|---|---|---|
| 1228495 | 4/1971 | United Kingdom | 260/570 |
| 1298258 | 11/1972 | United Kingdom | 260/570 |

*Primary Examiner*—Robert V. Hines
*Attorney, Agent, or Firm*—Gene Harsh; Joseph C. Gil

[57] ABSTRACT

A process is provided for making an aromatic polyamine by condensing an aromatic amine with formaldehyde wherein the reaction mixture is maintained at a boiling temperature under reflux and formaldehyde is mixed with the stream of condensed vapors returning to the reactor from the reflux condenser. The process produces a diphenylmethane polyamine particularly well suited for phosgenation to form the corresponding polyisocyanate.

15 Claims, 1 Drawing Figure

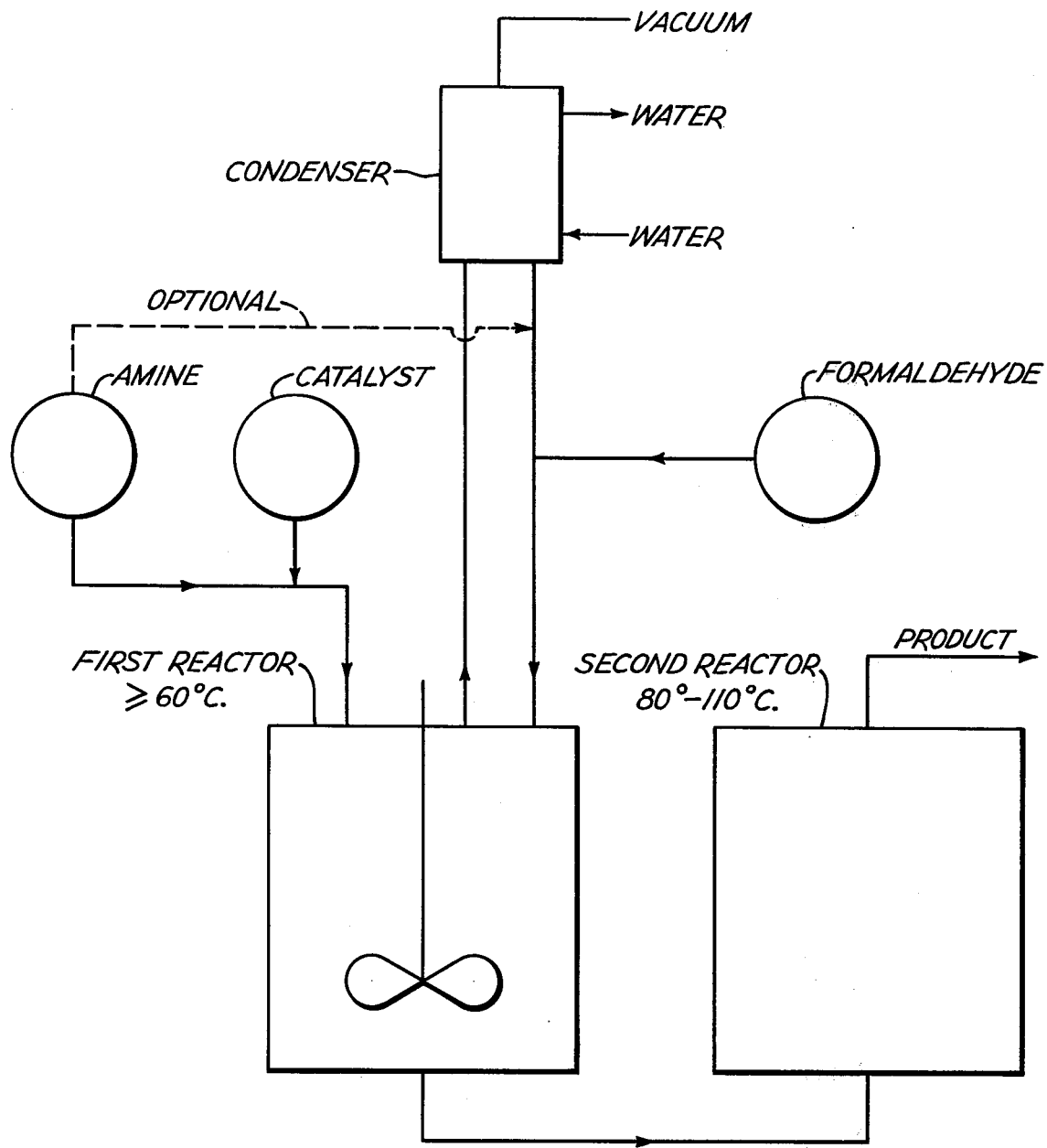

METHOD FOR MAKING A POLYAMINE

This invention relates generally to amines and more particularly to an improved method for the manufacture of aromatic polyamines by condensation of an aromatic amine with formaldehyde which are especially well suited for phosgenation to form the corresponding polyisocyanates.

The preparation of aromatic polyamines by the condensation of a monoamine and formaldehyde has been proposed before. In such a process, the usual practice is to mix an aqueous solution of from about 30% to about 37% by weight formaldehyde with a mixture of an amine and a catalyst for the condensation reaction. The mixture is cooled during the first step of the process until a pre-condensate is formed and, in a second step, the temperature is raised to complete the reaction. All of these processes have one thing in common; two separate steps are required to produce the desired properties of the final product. One disadvantage of such a process is that the reaction mixture passes through a non-homogeneous and sticky condition in the first step at the low temperature because of the formation of undesirable products which cling to the cold reactor walls (especially in a continuous process). These deposits on the walls of the reactor hinder the heat transfer and require frequent cleaning of the parts of the apparatus.

In the second step of the reaction at an elevated temperature during which the pre-condensates produced in the first step are rearranged to form polyaryl polymethylene compounds, the mixture is thin and homogeneous and easy to handle. However, up to the present time, it has not been possible to establish in the first step product properties which are characteristic for the second step. All attempts to elevate the temperature during the pre-condensation of formaldehyde with an aromatic primary amine have resulted in the production of side reaction products which complicate the subsequent process wherein the amines are reacted with phosgene to prepare the corresponding isocyanates. Formation of resin-like deposits on the walls of the apparatus are the result.

It is therefore an object of this invention to provide an improved process for making polyamines by the condensation of formaldehyde with an aromatic amine. Another object of the invention is to provide a process for making aromatic polyamines suitable for reaction with phosgene to prepare the corresponding polyisocyanates. A still further object of the invention is to provide a process for making diphenylmethane polyamines by reacting formaldehyde with an aromatic monoamine which avoids the problems heretofore inherent in the prior art processes.

The foregoing objects and others are accomplished in accordance with this invention, generally speaking, by providing a process for condensing formaldehyde with an aromatic amine wherein the reaction mixture in which formaldehyde and the amine are reacted is maintained under reflux and formaldehyde is mixed with the condensed vapor returning during reflux to the reaction vessel. It has been surprisingly discovered that cooling is not required as the formaldehyde and amine are mixed together provided that the reaction mixture is boiling under reflux as formaldehyde is added thereto as an aqueous formalin solution and the formalin is mixed with the refluxing liquid and added to the contents of the reaction vessel in admixture with the condensed vapors returning from the reflux condenser. The process of the invention thus permits the pre-condensation of formaldehyde and amine and the rearrangement of the resulting pre-condensates into a diphenylmethane amine in a single step at an elevated temperature with the production of a final product of excellent quality while avoiding the problems inherent in the first step of the prior art processes. The addition of the formaldehyde to the condensed reflux vapors permits the use of a dilute aqueous formaldehyde solution without the addition of large amounts of water to the system which would change the product composition and would drastically lower the volume-time yield of a given installation. Because of the dilution of the formaldehyde solution with condensed reflux vapors, the reaction temperature can be elevated to a level at which pre-condensation and rearrangement takes place at the same time and the reaction mixture represents a clear liquid, which does not adhere to the walls of the reactor. A preferred embodiment of this invention is, therefore, a process for the manufacture of polyamines by condensation of aromatic amines with formaldehyde in the presence of acid catalysts, characterized in that the reaction is conducted in a boiling reaction mixture under reflux conditions and the condensed reflux vapors are used to dilute the formaldehyde which is added to the reaction mixture and the reaction is completed with further heating and a conventional alkaline finish.

An embodiment of an apparatus suitable for practicing the invention is illustrated diagrammatically in the drawing. In this apparatus amine and catalyst are premixed and flow together into a reactor where the reaction mixture is maintained at a boiling temperature of at least about 60° C. Vapors from the boiling reaction mixture are condensed in a condenser and flow back into the first reactor. The pressure in the apparatus can be reduced by a suitable vacuum pump connected to the condenser. The formalin is added to the condensed vapors flowing from the condenser to the reactor. The product flows from the first reactor to a second one where a somewhat higher temperature may be used to expedite rearrangement into diphenylmethane diamines and higher condensation products thereof.

In accordance with the invention, the reaction can be performed under atmospheric pressure or under a reduced pressure whereby the reaction temperature is reached at the boiling temperature of the reaction mixture under the existing pressure. However, the pressure should be such that the reaction temperature is above the temperature required for rearrangement of the pre-condensates into diphenylmethane bodies, i.e. 60° C. or above. In aqueous systems, any temperature between 60° C. and 110° C. is suitable, but the most advantageous temperature is from 60° C. to 90° C. Liquid diluents which are miscible with formalin and are volatile at the reaction temperature, such as an alcohol or a ketone may be included in the aqueous reaction mixture, but such diluents are not required. To assist the dilution, other system-internal distillates can also be added to the mixture of condensate reflux and formalin in continuously operating apparatus. These distillates, for example, occur in the residence time providing heated vessels in which the condensation reaction is completed, in neutralizing the acid catalyst with a strong alkali, and in the distillation columns, in which the resulting polyamines are freed of water and aromatic monoamines. The source of fluid for the dilution of the formaldehyde is, of course, unimportant. For this process it is only important that the formaldehyde is diluted from its commercially available concentration of say about 30% to 40%, to about 1% to about 10% by weight, preferably to from about 1% to about 6% by weight when it is mixed with the reaction mixture and that the total water content of the reaction mixture be in the desired range, usually from about 30% to about 50% by weight. Less dilution of the formalin with water is required when adding aromatic amine to the water formalin mixture running into the reaction mixture. The amount of aromatic amine which can be added for dilution purposes can vary up to the total amount of the part of aromatic amine which is not used for the neutralization of the acid catalyst used in the process.

The process of the invention is applicable to the preparation of polyamines by reaction of formaldehyde with more than one aromatic amine. The composition of the resulting polyamine mixture can be varied by varying the method in which the formaldehyde and two different aromatic amines are mixed together. The formaldehyde can be reacted with both amines at the same time, or one amine can be fed directly to the reaction mixture while the other one is added over the water circulation together with the formaldehyde.

Any practical amine to formaldehyde and amine to catalyst molar ratio may be used in practicing the invention. Preferably, the molar ratio of aromatic amine to formaldehyde is about 10:1 to 1.5:1. The preferred molar ratio of amine to catalyst is from about 1:1 to 20:1. It should not be lower than 1:1 with the use of volatile catalysts such as hydrochloric acid.

Any suitable aromatic amine may be used in practicing the invention such as, for example, aniline; o-chloroaniline; m-chloroaniline; p-chloroaniline; o-bromoaniline; m-bromoaniline; p-bromoaniline; o-anisidine; m-anisidine; p-anisidine; o-phenetidine; m-phenetidine; p-phenetidine; o-toluidine; m-toluidine; p-toluidine; o-ethylaniline; m-ethylaniline; p-ethylaniline; o-isopropylaniline; m-isopropylaniline; p-isopropylaniline; o-xylidene; m-xylidene; p-xylidene α- and β-naphthylamine; o-benzylaniline; m-benzylaniline; p-benzylaniline; 2,6-dimethylaniline; 2,6-diethylaniline; 2,6-diisopropylaniline; 2,4-diaminotoluene; 2,6-diaminotoluene; o-diaminobenzene, m-diaminobenzene; p-diaminobenzene; N-methylaniline; N-ethylaniline; N-propylaniline; N-butylaniline; N-oxyethylaniline; N-chloroethylaniline; o-methyl-N-methylaniline; m-methyl-N-methylaniline; p-methyl-N-methylaniline; o-methyl-N-ethylaniline; m-methyl-N-ethylaniline; p-methyl-N-ethylaniline; o-chloro-N-methylaniline; m-chloro-N-methylaniline; p-chloro-N-methylaniline; o-chloro-N-ethylaniline; m-chloro-N-ethylaniline; p-chloro-N-ethylaniline or mixtures thereof or mixtures of these amines with their formaldehyde condensation products of the diarylmethane type. Preferred amines are the aromatic monoamines, aniline, o-toluidine, N-methylaniline; N-ethylaniline and mixtures thereof.

The formaldehyde used in the process according to the invention may be added in the form of an aqueous solution or an aqueous alcohol or ketone solution such as an aqueous-methanol or the like solution. Suitable ketones are acetone and methylethyl ketone. Preferably an aqueous formaldehyde solution without alcohol or ketone is used, but up to about 10% of an alcohol such as ethanol or methanol based on the weight of formaldehyde added to the reaction mixture may be used. Any suitable acidic reacting catalyst for the reaction, inorganic or organic, may be used in any catalytic amount.

For example, hydrochloric acid, sulfuric acid, hydrobromic acid, phosphoric acid, acetic acid, trifluoroacetic acid, benzene sulfonic acid or the like, as well as the acidic salts of such acids such as, potassium hydrogensulfate, and mixtures of such acids with salts thereof may be used. Preferably the pKa of the catalyst is below 2.5. Aqueous hydrochloric acid is the preferred catalyst.

The primary polyamines produced by the process of the invention are valuable starting amines for the manufacture of the corresponding polyisocyanates by phosgenating the polyamines by conventional processes. They can be used also for the manufacture of a polyurea by reaction with isocyanate, especially if the amine is an N-substituted amine or some of the amine is N-substituted.

In the following examples, the hydrochloric acid and the formalin are 37% aqueous solutions. Temperatures are °centigrade. Reaction conditions and the results of analysis made on the product are shown in Table I.

EXAMPLES 1 TO 3

A mixture of 558 g (6 mol) aniline, 44 g water and 279 g hydrochloric acid is heated at the boiling temperature in a vessel provided with a reflux condenser. 256 g (3.16 mol) of formalin are added slowly by dropper over a period of two hours to the refluxing liquid. After this addition, the content of the vessel is heated for 30 minutes under reflux and 260 grams of 50% caustic are added. (Results are described in Table I. The reaction temperatures of below 105° C. in that Table are maintained by pulling a slight vacuum in the vessel). The mixture forms two phases. The inorganic phase is separated and discarded. The organic phase is heated under vacuum to remove traces of water and the unreacted aniline. The distillation residue is the polyamine.

EXAMPLE 4

As a reference, Example 1 is repeated with the exception that the formalin is added dropwise directly to the heated mixture of aniline and hydrochloric acid instead of to the condensed vapors returning from the reflux condenser.

EXAMPLE 5

A mixture of 279 g (3 mol) aniline, 44 g water and 279 g hydrochloric acid is heated at the reflux temperature just like in Example 1. 279 g (3 mol) aniline and 256 g (3.16 mol) formalin are simultaneously added dropwise to the reflux flow over a period of 60 minutes. After this addition the reflux is continued for 30 minutes. The polyamine is recovered as in Example 1.

EXAMPLE 6

Example 1 is repeated with only one change, that the boiling reaction temperature is kept at 70° C. by applying a slight vacuum and that the aniline to formaldehyde molar ratio is 2.2 to 1.

EXAMPLE 7

Example 6 is repeated with the exception that the aniline to formaldehyde molar ratio is 1.8 to 1.

EXAMPLE 8

A mixture of 558 g (6 mol) aniline, 44 g water, 100 g methanol and 279 g hydrochloric acid is mixed with 270 g (3.33 mol) formalin as described in Example 1. The reaction temperature is 92° C. After the addition of formalin, the mixture is refluxed for one hour. The polyamine is recovered as in Example 1.

EXAMPLE 9

Example 1 is repeated except that the aniline is replaced with 642 g (6 mol) N-methylaniline.

which is advantageously suitable for the manufacture of a polyurethane. The composition of the polyisocyanate corresponds to the isomer composition of the mixture of the polyamines shown in Table I.

Any of the other amines and catalysts disclosed as suitable for use in the invention can be substituted for those used in the foregoing examples.

TABLE I

| Ex. | Mol Ratio Amine/CH$_2$O | Reaction Temperature | Reaction Pressure | Yield | % Diamine | % 2,4'-MDA | % 4,4'-MDA | % N-Methyl MDA | Phosgenization | % NCO | % Acid Chloride |
|---|---|---|---|---|---|---|---|---|---|---|---|
| 1 | 1.9/1 | 105° C. | 750 mm | 505 g | 46.3 | 8.2 | 91.2 | 0.4 | good | 32.1 | 0.12 |
| 2 | 1.9/1 | 80° C. | 308 mm | 518 g | 51.5 | 4.7 | 94.8 | 0.3 | good | 32.1 | 0.06 |
| 3 | 1.9/1 | 60° C. | 128 mm | 531 g | 57.0 | 3.6 | 96.0 | 0.3 | good | 32.2 | 0.07 |
| 4 | 1.9/1 | 105° C. | 750 mm | 496 g | 47.1 | 10.8 | 87.3 | 1.4 | bad | 31.0 | 0.34 |
| 5 | 1.9/1 | 105° C. | 750 mm | 489 g | 42.0 | 5.6 | 93.0 | 1.2 | good | 32.3 | 0.17 |
| 6 | 2.2/1 | 70° C. | 206 mm | 468 g | 65.2 | 5.8 | 93.7 | 0.3 | good | 32.6 | 0.13 |
| 7 | 1.8/1 | 70° C. | 196 mm | 541 g | 51.1 | 3.4 | 96.1 | 0.4 | good | 32.4 | 0.10 |
| 8 | 1.8/1 | 92° C. | 750 mm | 522 g | 43.8 | 6.4 | 93.1 | 0.3 | good | 31.9 | 0.20 |

| Ex. | Mol Ratio Amine/CH$_2$O | Reaction Temperature | Reaction Pressure | Yield | % Diamine | % Dimethyl MDA | % N-Methyl MDA | Phosgenization | % NCO | % Acid Chloride |
|---|---|---|---|---|---|---|---|---|---|---|
| 9 | 1.9/1 | 105° C. | 750 mm | 626 g | 64.7 | 100 | — | — | — | — |
| 10 | 1.9/1 | 105° C. | 750 mm | 551 g | 45.6 | 32.2 | 13.9 | 46.2 | — | — |
| 11 | 1.9/1 | 105° C. | 750 mm | 547 g | 48.3 | 32.9 | 23.8 | 37.3 | — | — |
| 12 | 1.9/1 | 105° C. | 750 mm | 535 g | 41.6 | 34.6 | 16.5 | 41.6 | — | — |
| 13 | 1.9/1 | 105° C. | 750 mm | 626 g | 60.8 | 100 | — | — | — | — |
| 14 | 2.5/1 | 105° C. | 750 mm | 478 g | 87.3 | — | — | — | — | — |
| 15 | 1.9/1 | 95° C. | 750 mm | 509 g | 48.9 | 6.2 | 92.1 | 0.3 | good | 31.8 | 0.18 |

Phosgenation:
Good - no tar formation
Bad - tar formation

EXAMPLE 10

Example 1 is repeated with the exception that a mixture of 279 g (3 mol) aniline and 321 g (3 mol) N-methylaniline is used.

EXAMPLE 11

Example 5 is repeated with the exception that the aniline added with the condensed reflux is replaced with 321 g (3 mol) N-methylaniline.

EXAMPLE 12

Example 5 is repeated with the exception that the aniline is replaced by 321 g (6 mol) N-methylaniline.

EXAMPLE 13

Example 1 is repeated except that the aniline is replaced by 642 g (6 mol) o-toluidine.

EXAMPLE 14

Example 1 is repeated except that 605 g (5 mol) N-ethylaniline, 162 g aqueous formaldehyde (2 mol) and 190 g hydrochloric acid (2 mol) are added.

EXAMPLE 15

Example 1 is repeated except that 100 g of ethanol is added to the aniline.

EXAMPLE 16

To a solution of 400 g phosgene in 3000 ml chlorobenzene which has been cooled to 0°, a solution of 200 g of the polyamine mixture obtained in Example 1 in 1000 ml chlorobenzene is added slowly with cooling and stirring to maintain the temperature of the mixture at 30° C. or below. The mixture is heated to 130° C. over a period of 2 hours while adding gaseous phosgene and is maintained for one more hour under reflux. The phosgene addition is then stopped, the phosgene which is still present in the solution is removed by purging with nitrogen and the solvent is evaporated under vacuum. About 250 g of organic polyisocyanate remains Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of a polyamine wherein an aromatic amine and formaldehyde are condensed in the presence of an acidic catalyst, the improvement which comprises boiling the reaction mixture under reflux at a temperature of at least 60° C. whereby vapors from the mixture are condensed and returned to the mixture, adding an aqueous formaldehyde solution to the said condensed vapors and recovering the resulting polyamine.

2. The process of claim 1 wherein the formaldehyde diluted with the condensate is an aqueous solution containing less than 10% formaldehyde by weight.

3. The process of claim 1 wherein the reaction is performed at atmospheric pressure.

4. The process of claim 1 wherein the reaction is performed at a pressure below atmospheric.

5. The process of claim 1 wherein the reaction is performed at 60° C.–110° C.

6. The process of claim 1 wherein the aqueous solution contains methanol or ethanol.

7. The process of claim 1 wherein an aromatic amine is added to the reaction mixture containing condensate and formaldehyde.

8. The process of claim 1 wherein aromatic amine is added with the reflux to the reaction mixture up to the amount which is not required for the neutralization of acid catalyst.

9. The process of claim 1 wherein the amine is aniline, o-toluidine, N-methylaniline, N-ethylaniline or mixtures thereof.

10. The process of claim 1 wherein a water soluble acid having a lower than 2.5 pKa value is used as the catalyst.

11. The process of claim 1 wherein the catalyst is hydrochloric acid.

12. The process of claim 1 wherein the molar ratio of aromatic amine to formaldehyde is from about 10:1 to 1.5:1.

13. The process of claim 1 wherein the molar ratio of aromatic amine to the catalyst is about 20:1 to 1:1.

14. The process of claim 1 wherein the polyamine is a diphenylmethane polyamine.

15. A process for the preparation of an organic polyisocyanate comprising
 (a) adding an aromatic amine and an acidic catalyst,
 (b) boiling the mixture under reflux at a temperature of at least 60° C. whereby vapors from the mixture are condensed and returned to the mixture,
 (c) gradually adding an aqueous formaldehyde solution to the said returning condensed vapors, and
 (d) phosgenating the resulting polyamine to form the corresponding polyisocyanate.

* * * * *